US012083544B2

(12) United States Patent
Nagao

(10) Patent No.: US 12,083,544 B2
(45) Date of Patent: Sep. 10, 2024

(54) NOZZLE

(71) Applicant: SUGINO MACHINE LIMITED, Uozu (JP)

(72) Inventor: Takeru Nagao, Uozu (JP)

(73) Assignee: SUGINO MACHINE LIMITED, Uozu (JP)

( * ) Notice: Subject to any disclaimer, the term of this patent is extended or adjusted under 35 U.S.C. 154(b) by 280 days.

(21) Appl. No.: 17/671,952

(22) Filed: Feb. 15, 2022

(65) Prior Publication Data

US 2022/0305501 A1 Sep. 29, 2022

(30) Foreign Application Priority Data

Mar. 25, 2021 (JP) ................................ 2021-051739

(51) Int. Cl.
*B05B 1/10* (2006.01)
*B05B 15/65* (2018.01)

(52) U.S. Cl.
CPC ................ *B05B 1/10* (2013.01); *B05B 15/65* (2018.02)

(58) Field of Classification Search
CPC .................................. B05B 1/10; B05B 15/65
USPC ................................ 239/589, 591, 596, 600
See application file for complete search history.

(56) References Cited

U.S. PATENT DOCUMENTS 3,045,932 A * 7/1962 Steinen .................. B05B 1/042 239/596
5,346,138 A 9/1994 Ridenour
6,814,316 B2 * 11/2004 Gromes, Sr. ........... B26F 3/004 239/596

FOREIGN PATENT DOCUMENTS

JP S48-013186 Y1 4/1973
JP S60-195008 U 12/1985
JP 2001186917 A 7/2001

OTHER PUBLICATIONS

"Ceramax Spray Nozzle Catalog, No. J983D", 2015, 4 pages, Spraying Systems Japan, Inc.
Japanese Office Action mailed on Nov. 24, 2021 in a corresponding Japanese Patent Application No. 2021-051739 ( 3 pages).
Extended European Search Report mailed on Jul. 19, 2022 in a corresponding European Patent Application No. 22157734.9 (10 pages).

* cited by examiner

*Primary Examiner* — Steven J Ganey
(74) *Attorney, Agent, or Firm* — United IP Counsellors, LLC

(57) ABSTRACT

Provided is a nozzle for jetting liquid in an accurate direction with respect to a nozzle mounting hole. The nozzle is mounted to a nozzle holder having a nozzle mounting hole having a right cylindrical shape, an outlet port connected to the nozzle mounting hole, and a mounting internal thread. The nozzle includes: a mounting external thread disposed at a first end, and is a parallel thread that fits with the mounting internal thread; a cylindrical portion that fits in the nozzle mounting hole; a first introducing passage disposed coaxially with the cylindrical portion; a cylindrical choke portion disposed coaxially with the cylindrical portion, and a conical portion connecting the first introducing passage to the cylindrical choke portion.

11 Claims, 3 Drawing Sheets

NOZZLE

CROSS-REFERENCE TO RELATED APPLICATIONS

This application claims the benefit of priority to Japanese Patent Application No. 2021-051739, filed on Mar. 25, 2021, the entire contents of which are hereby incorporated by reference.

BACKGROUND

1. Technical Field

The present invention relates to a nozzle for jetting liquid.

2. Description of the Background

A proposed nozzle includes a nozzle tip that is press-fitted in a nozzle case (for example, Japanese Utility Model Publication No. S48-13186). The nozzle has a tapered thread (for example, Ceramax Spray Nozzle Catalog, No. J983D, manufactured by Spraying Systems Japan, Inc.). In these conventional nozzles, the jet may be inclined with respect to a mounting hole of the nozzle. Further, the nozzle tip can not be replaced in the conventional nozzle.

BRIEF SUMMARY

An object of the present invention is to provide a nozzle capable of jetting liquid in an accurate direction with respect to a nozzle mounting hole.

A first aspect of the present invention provides a nozzle configured to be mounted to a nozzle holder having a nozzle mounting hole having a right cylindrical shape, an outlet port connected to the nozzle mounting hole, and a mounting internal thread disposed at the outlet port, the nozzle including:

a mounting external thread disposed at a first end, the mounting external thread being a parallel thread that fits with the mounting internal thread;

a cylindrical portion configured to fit in the nozzle mounting hole;

a first introducing passage disposed coaxially with the cylindrical portion;

a cylindrical choke portion disposed coaxially with the cylindrical portion, the cylindrical choke portion having a smaller diameter than the first introducing passage; and a conical portion connecting the first introducing passage to the cylindrical choke portion.

A second aspect of the present invention provides a nozzle configured to be mounted to a nozzle holder having a nozzle mounting hole having a right cylindrical shape, an outlet port connected to the nozzle mounting hole, and a mounting internal thread disposed at the outlet port, the nozzle including:

a body including
- a mounting external thread disposed at a first end, the mounting external thread being a parallel thread that fits with the mounting internal thread,
- a cylindrical portion configured to fit in the nozzle mounting hole,
- a tip mounting hole disposed coaxially with the cylindrical portion,
- a second introducing passage connected to the tip mounting hole, the second introducing passage disposed coaxially with the cylindrical portion, and
- a cap external thread disposed at a second end that is opposite to the first end; a nozzle tip inserted in the tip mounting hole, the nozzle tip including
- an outer cylindrical surface that fits in the tip mounting hole,
- a third introducing passage connected to the second introducing passage, the third introducing passage disposed coaxially with the outer cylindrical surface, the third introducing passage having the same diameter as the second introducing passage,
- a cylindrical choke portion disposed coaxially with the outer cylindrical surface, the cylindrical choke portion having a smaller diameter than the third introducing passage, and
- a conical portion connecting the third introducing passage to the cylindrical choke portion; and a cap including
- a jet passage hole, and
- a cap internal thread that fits with the cap external thread.

The mounting hole has a right cylindrical shape. The outlet port is connected to the bottom surface of the mounting hole. The mounting internal thread is disposed at the opening of the outlet port.

The mounting external thread and the cylindrical portion are arranged in this order from a basal end of the nozzle. The mounting external thread is directly connected to the basal end of the cylindrical portion. The cylindrical portion has a larger outer diameter than the mounting external thread.

The first introducing passage extends from the first end of the nozzle. The cylindrical choke portion extends from a second end that is the opposite to the first end of the nozzle. The cylindrical portion is disposed in the middle portion of the nozzle. The cylindrical portion fits with the bottom surface and side surface of the nozzle mounting hole. The conical portion is frustoconical. The conical portion has a base at the first end having the same diameter as the first introducing passage, and has a base at the second end having the same diameter as the cylindrical choke portion. The conical portion smoothly connects the first introducing passage and the cylindrical choke portion. The conical portion is coaxial with the cylindrical portion.

The first restraining plane is disposed on the end face of the nozzle mounting hole. The first abutting plane is disposed on the first end face of the cylindrical portion. A first packing for sealing between the first abutting plane and the first restraining plane may be disposed.

The mounting external thread is disposed at a first end of the body. A cap external thread is disposed at a second end that is opposite to the first end of the body. The cylindrical portion is disposed in the middle portion and nearer to the first end of the body. The tip mounting hole extends from the second end of the body. A second introducing passage extends from the first end of the body. The second introducing passage is directly connected to the tip mounting hole. The third introducing passage is disposed at the first end of the nozzle tip. The cylindrical choke portion is disposed from the second end toward the middle portion of the nozzle tip.

The conical portion is frustoconical. The conical portion has a base at the first end having the same diameter as the third introducing passage, and has a base at the second end having the same diameter as the cylindrical choke portion. The conical portion smoothly connects the third introducing passage and the cylindrical choke portion. The conical portion is coaxial with the outer cylindrical surface.

The first abutting plane is disposed on the first end face of the cylindrical portion. A first packing for sealing between the first abutting plane and the first restraining plane may be disposed.

The second restraining plane is disposed on the first end face of the tip mounting hole. The second abutting plane is disposed on the first end face of the nozzle tip. A second packing for sealing between the second abutting plane and the second restraining plane may be disposed.

The cap is fastened to the body with the nozzle tip. The cap presses the nozzle tip against the body.

The second introducing passage has a smaller diameter than the tip mounting hole. The diameter of the cylindrical choke portion is the diameter of the nozzle hole. The second introducing passage and the third introducing passage forms an introducing passage which is a single cylindrical hole.

The nozzle according to the present invention allows to jet the liquid in the accurate direction with respect to the mounting hole of the nozzle.

DETAILED DESCRIPTION

First Embodiment

Figure 1:
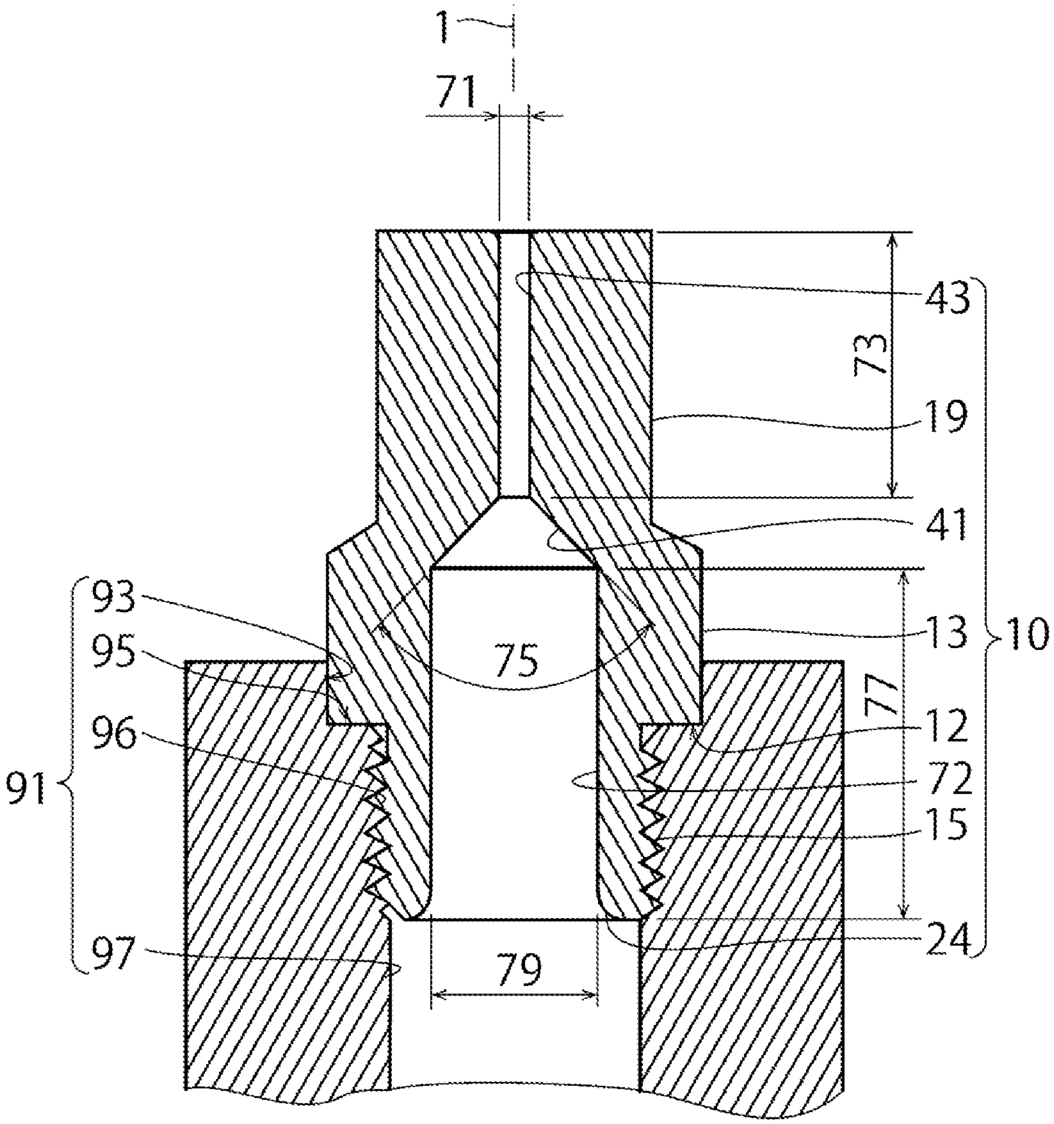
FIG. 1 is a longitudinal sectional view of a nozzle according to a first embodiment.

As shown in FIG. 1, a nozzle 10 is mounted to a nozzle holder 91. For example, the nozzle holder 91 is a metal member. The nozzle holder 91 has a outlet port 97, a mounting internal thread 96, and a nozzle mounting hole 93. The nozzle holder 91 may have a first restraining plane 95.

The nozzle mounting hole 93 has a right cylindrical shape. The cylindrical surface of the nozzle mounting hole 93 is smoothly finished. The nozzle mounting hole 93 has a larger diameter than the outlet port 97.

The outlet port 97, which is a cylindrical hole, is a liquid flow path. The outlet port 97 is connected to a bottom surface of the nozzle mounting hole 93. Preferably, the outlet port 97 is disposed coaxially with the nozzle mounting hole 93.

The mounting internal thread 96 is a parallel thread. Preferably, a thread diameter of the mounting internal thread 96 is substantially the same as the diameter of the outlet port 97. The first restraining plane 95 is an end face of the nozzle mounting hole 93. The first restraining plane 95 is planar and smoothly finished.

The nozzle 10 includes a mounting external thread 15, a cylindrical portion 13, a spanner applying portion 19, an introducing passage (first introducing passage) 72, a cylindrical choke portion 43, and a conical portion 41. The nozzle 10 may have a first abutting plane 12 and an inlet port 24. FIG. 1 shows a cross-sectional view taken along a center axis 1 of the cylindrical portion 13.

The mounting external thread 15 is disposed at a basal end (first end) of the nozzle 10. The mounting external thread 15, which is a parallel thread, fits into the mounting internal thread 96.

The cylindrical portion 13 is disposed in a middle portion nearer to the basal end of the nozzle 10. The cylindrical portion 13, which has a right cylindrical shape, is inserted into the nozzle mounting hole 93. The cylindrical portion 13 has a larger diameter than the mounting external thread 15. The cylindrical portion 13 fits into the nozzle mounting hole 93. The first abutting plane 12, which is disposed on the end face of the cylindrical portion 13, is smoothly finished.

The first abutting plane 12 is in close contact with the first restraining plane 95 to seal liquid. The first abutting plane 12 and the first restraining plane 95 are in close contact with each other with the first restraining plane 95 slightly crushed. Thus, the gap between the first abutting plane 12 and the first restraining plane 95 is liquid-sealed.

The spanner applying portion 19 is disposed in the middle portion of the nozzle 10 and toward the distal end of the cylindrical portion 13. For example, the spanner applying portion 19 has two parallel planes. The spanner applying portion 19 may be, for example, a hexagonal prism.

The first abutting plane 12 may be omitted. The first abutting plane 12 and the first restraining plane 95 may not be in direct contact with each other to arrange the packing between them. The packing is, for example, an O-ring or a liquid seal. A packing groove may be arranged on the first abutting plane 12 to receive the packing.

The introducing passage 72 is disposed coaxially with the cylindrical portion 13 inside the nozzle 10. The introducing passage 72 is disposed from the basal end toward the middle portion of the nozzle 10. An inner diameter of the introducing passage 72 is an introducing passage diameter 79.

The inlet port 24 is disposed at the basal end of the introducing passage 72. Preferably, the inlet port 24 has a cross-section rounded with a quarter circle. The inlet port 24 smoothly connects the base end face and the introducing passage 72 of the nozzle 10.

When the introducing passage 72 has a relatively small diameter than the mounting external thread 15, the inlet port 24 may include a conical portion having a decreasing diameter toward the distal end.

The cylindrical choke portion 43, which is a cylindrical hole, is disposed at the distal end (second end) of the nozzle 10. The cylindrical choke portion 43 is disposed coaxially with the cylindrical portion 13. An inner diameter of the cylindrical choke portion 43 is a nozzle hole diameter 71. A length of the cylindrical choke portion 43 is a choke length 73.

The conical portion 41 is a cavity connecting the introducing passage 72 and the cylindrical choke portion 43. The conical portion 41, which has a right conical surface, is disposed coaxially with an outer cylindrical surface 33.

The conical portion 41 may connect the introducing passage 72 and the cylindrical choke portion 43 with a smooth curved surface.

For example, the nozzle 10 according to the present embodiment is applied to a numerically controlled cleaning apparatus. The cleaning apparatus is disclosed, for example, in Japanese Patent Nos. 6147623 and 6227496. The nozzle 10 ejects, for example, water or an aqueous cleaning liquid. The ejection pressure is, for example, 1.5 MPa to 50 MPa.

The nozzle 10 according to the present embodiment has a right cylindrical shape as a whole. The nozzle 10 has an inner shape that is a rotary shape coaxial with the cylindrical portion 13. Thus, the nozzle 10 is easy to manufacture, and easy to finish to an accurate shape. This improves the convergence, biting property and inclination of the jet ejected from the nozzle 10.

The convergence is the extent of the liquid jet to diverge. The jet having a higher convergence is linear. The biting property indicates the power to damage and destroy a workpiece by erosion when the jet collides with the workpiece. The inclination refers to an inclination of the center of the jet from the nozzle 10.

By mounting the mounting external thread 15 that is a parallel thread to the nozzle holder 91, the cylindrical portion 13 is fitted to the nozzle mounting hole 93. Thus, the nozzle 10 and the nozzle holder 91 are assembled coaxially to each other. Then, the cylindrical choke portion 43, the conical portion 41 and the introducing passage 72 are accurately positioned with respect to the nozzle mounting hole 93. This suppresses the inclination of the nozzle 10 with respect to the nozzle holder 91 when the nozzle 10 is screwed into the nozzle holder 91.

As the cylindrical portion 13 is coaxially disposed in the nozzle mounting hole 93, the first abutting plane 12 uniformly presses the first restraining plane 95. This increases the sealing of the first abutting plane 12 and the first restraining plane 95.

The first abutting plane 12 is in contact with the first restraining plane 95 to be pressed against the first restraining plane 95 by an axial force applied to the mounting external thread 15. This causes the nozzle 10 to be constrained by two surfaces of the cylindrical surface and the plane, which further suppresses the inclination of the nozzle 10 with respect to the nozzle holder 91. The height of the nozzle 10 from the nozzle holder 91 is accurately positioned. This accurately determines the dimensions and position of the entire nozzle 10 with respect to the nozzle holder 91.

The cylindrical portion 13 fitted with the nozzle mounting hole 93 causes the first abutting plane 12 to be in contact with the first restraining plane 95. This allows the nozzle 10 to be mounted to the nozzle holder 91 with high accuracy even if the nozzle 10 mounted to a numerically controlled cleaning apparatus is replaced. This suppresses the change in the position and angle at which the jet collides with the cleaning workpiece even after replacing the nozzle 10. This easily keeps the degree of cleaning of the workpiece constant.

The first abutting plane 12 is in surface contact with the first restraining plane 95 to seal the liquid. This improves the assembling property. The nozzle 10 is assembled to the nozzle holder 91 without interposing a sealing tape or a sealing material or the like. This further suppresses the inclination of the nozzle 10 when the nozzle 10 is assembled to the nozzle holder 91. Further, this eliminates the possibility of the sealing material sticking out to the inside of the nozzle 10 and the outlet port 97. This suppresses the convergence, the biting property and the inclination of the jet ejected from the nozzle 10.

The nozzle 10 is thus precisely positioned relative to the nozzle mounting hole 93. This allows the liquid jet ejected from the cylindrical choke portion 43 to be more accurately ejected along the nozzle mounting hole 93.

A straightener may be disposed inside the introducing passage 72. The rectifier is, for example, a rectifier described in Japanese Patent No. 6417158.

For example, the nozzle hole diameter 71 is 0.8 mm to 2.3 mm. Preferably, the choke length 73 is 3 to 6 times the nozzle hole diameter 71. Preferably, the introducing passage diameter 79 is 2 to 7 times the nozzle hole diameter 71. Preferably, the length 77 of the introducing passage 72 is 4 to 8 times the nozzle hole diameter 71. Preferably, an apex angle 75 of the conical portion 41 is 60 to 90 degrees.

Second Embodiment

Figure 2:
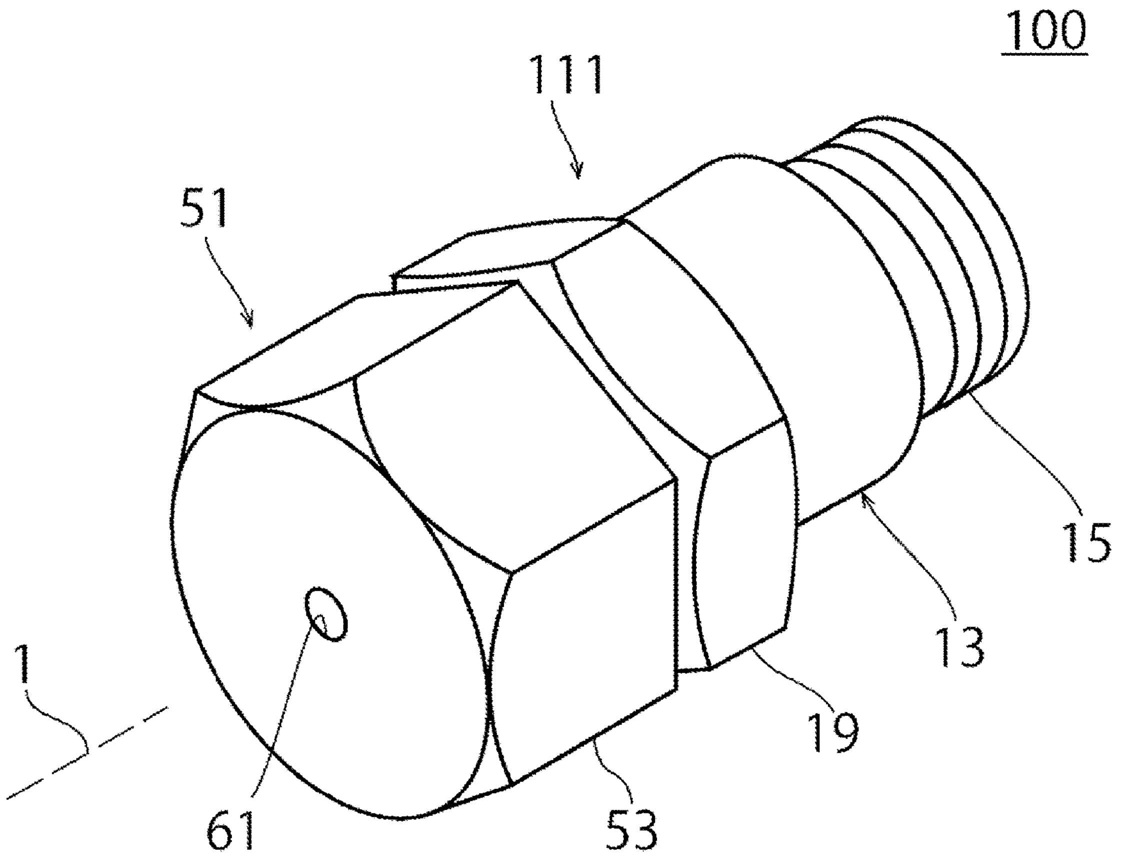
FIG. 2 is a perspective view of a nozzle according to a second embodiment.
Figure 3:
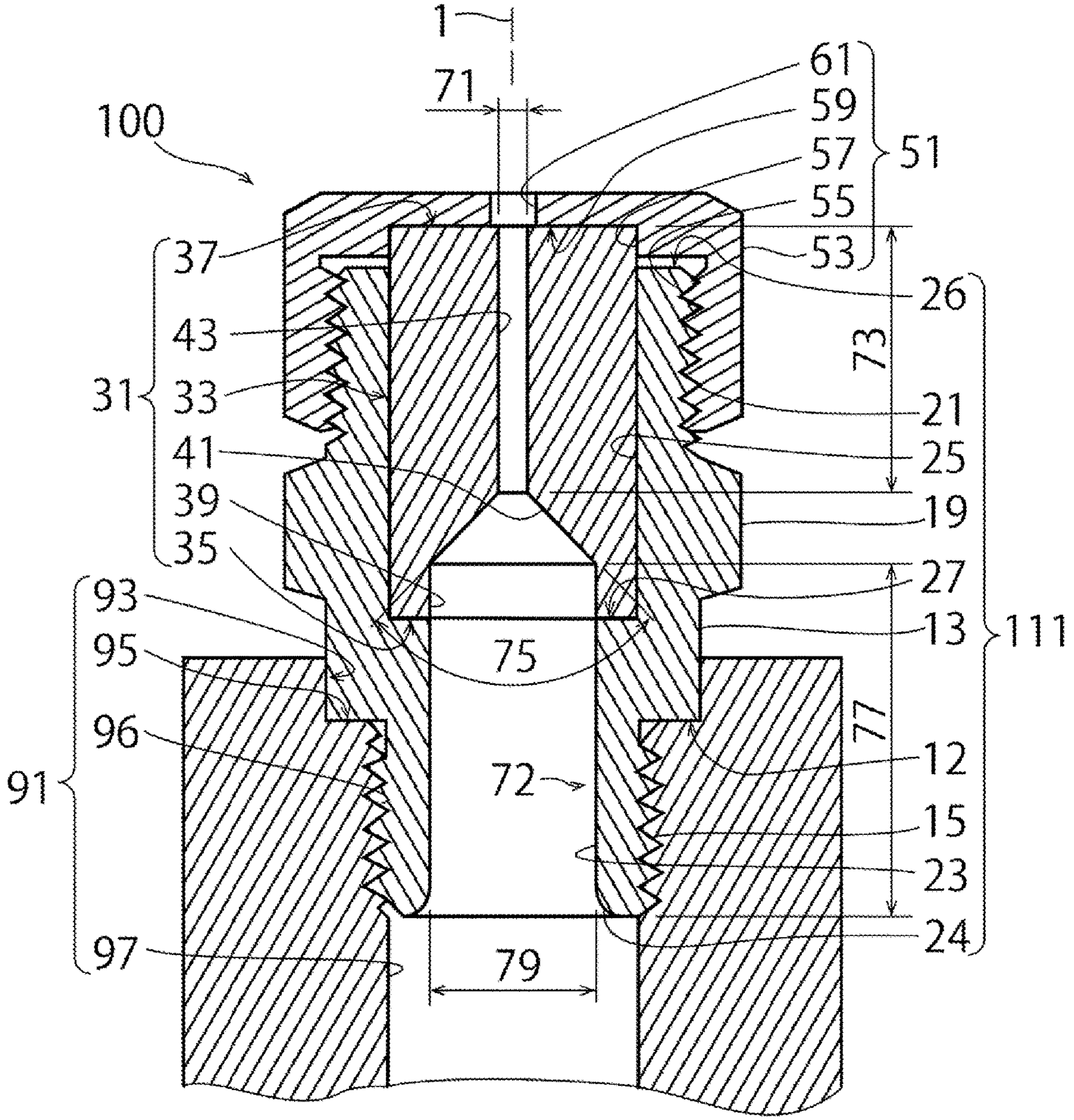
FIG. 3 is a longitudinal sectional view of the nozzle according to the second embodiment.

As shown in FIGS. 2 and 3, a nozzle 100 according to the present embodiment includes a body 111, a nozzle tip 31, and a cap 51. The body 111 has a cylindrical portion 13. FIG. 3 is a cross-sectional view taken in a plane passing through the center axis 1 of the cylindrical portion 13.

The body 111 includes a mounting external thread 15, a cylindrical portion 13, a cap external thread 21, a tip mounting hole 25, and a second introducing passage 23. The body 111 may have a first abutting plane 12, a second restraining plane 27, a spanner applying portion 19, an inlet port 24, and a distal end face 26.

The mounting external thread 15, the cylindrical portion 13, the spanner applying portion 19, and the cap external thread 21 are arranged on the outer surface of the body 111 in this order from the basal end. The cylindrical portion 13 is disposed in the middle portion and nearer to the basal end of the body 111.

The cap external thread 21, which is a parallel screw, is disposed at the distal end of the body 111.

The body 111 has the distal end face 26 at the distal end. The distal end face 26 is, for example, a flat surface.

The tip mounting hole 25, which is a bottomed cylindrical hole, is disposed from the distal end toward the middle portion of the body 111. The tip mounting hole 25 is disposed coaxially with the cylindrical portion 13. The tip mounting hole 25 has a smooth inner surface. The second restraining plane 27 is the bottom surface of the tip mounting hole 25.

The second introducing passage 23 penetrates from the basal end of the body 111 into the tip mounting hole 25. The second introducing passage 23 is disposed coaxially with the cylindrical portion 13. The introducing passage diameter 79 of the second introducing passage 23 is smaller than the tip mounting hole 25. The inlet port 24 is disposed at the basal end of the second introducing passage 23.

The nozzle tip 31 includes an outer cylindrical surface 33, a third introducing passage 39, a cylindrical choke portion 43, and a conical portion 41. The nozzle tip 31 may have a second abutting plane 35 and a distal end face 37. The nozzle tip 31 is a member made of metal or ceramic.

The nozzle tip 31 has an outer shape of a right cylinder. The outer cylindrical surface 33, which is a cylindrical surface, fits with the tip mounting hole 25. The distal end face 37 is, for example, a flat surface. The second abutting plane 35 is disposed at the basal end of the nozzle tip 31. The second abutting plane 35 is, for example, a flat surface.

The second abutting plane 35 is in close contact with the second restraining plane 27 to seal liquid. The second abutting plane 35 and the second restraining plane 27 are in close contact with each other with the second restraining plane 27 slightly crushed. Thus, the gap between the second abutting plane 35 and the second restraining plane 27 is liquid-sealed. The outer cylindrical surface 33 contacting with the tip mounting hole 25 allows the body 111 and the nozzle tip 31 to be assembled coaxially. Further, the second restraining plane 27 contacting with the second abutting plane 35 allows the nozzle tip 31 to be accurately assembled in the axial direction with respect to the body 111.

The second abutting plane 35 and the second restraining plane 27 may not be in direct contact with each other to arrange a packing between them. The packing is, for example, an O-ring or a liquid seal. A packing groove may be arranged on the second abutting plane 35 to receive the packing.

The third introducing passage 39 is disposed at the basal end of the nozzle tip 31. The third introducing passage 39 is a cylindrical hole having an introducing passage diameter 79. The third introducing passage 39 is disposed coaxially with the outer cylindrical surface 33.

The cylindrical choke portion 43 is disposed coaxially with the outer cylindrical surface 33 at the distal end of the nozzle tip 31. The conical portion 41 connects the third introducing passage 39 and the cylindrical choke portion 43. The conical portion 41 is disposed coaxially with the outer cylindrical surface 33. The conical portion 41 may connect the third introducing passage 39 and the cylindrical choke portion 43 with a smooth curved surface.

The cap 51 has a jet passage hole 61 and a cap internal thread 55. The cap 51 may include a tip support hole 57 and a spanner applying portion 53. The cap 51 is a cylindrical or hexagonal cylindrical shape. The cap 51 is largely hollowed out from the basal end. The cap 51 has a cap internal thread 55 on its inner surface. The cap internal thread 55 fits with the cap external thread 21.

The jet passage hole 61 penetrates the center of the cap 51. The jet passage hole 61 is substantially coaxial with the cap internal thread 55. The jet passage hole 61 has a slightly larger diameter than the nozzle hole diameter 71, and significantly smaller than the outer cylindrical surface 33.

The spanner applying portion 53 is disposed on the outer surface of the cap 51. When the cap 51 has a hexagonal prism shape, the outer surface of the cap 51 becomes the spanner applying portion 53. The spanner applying portion 53 may be two parallel surfaces.

The tip support hole 57 is disposed on the bottom surface of the cap internal thread 55. The tip support hole 57 has a bottom surface 59. The tip support hole 57 is substantially coaxial with the cap internal thread 55. The tip support hole 57 has a substantially the same diameter as the outer cylindrical surface 33. The tip support hole 57 may be fitted with the outer cylindrical surface 33.

The cap 51 sandwiches the nozzle tip 31 to be fastened to the body 111 together with the nozzle tip 31. The distal end face 37 is in contact with the bottom surface 59. The cap 51 presses nozzle tip 31 against the body 111. Then, the second abutting plane 35 is in close contact with the second restraining plane 27.

Preferably, the nozzle tip 31 protrudes from the distal end face 26. At this time, the outer cylindrical surface 33 is fitted with the tip support hole 57. The cap 51 is thus coaxially disposed on the cylindrical portion 13. The distal end face 37 is in contact with the bottom surface 59. This accurately positions the height of the cap 51 from the nozzle holder 91. Thus, the dimensions and position of the entire nozzle 10 with respect to the nozzle holder 91 are accurately determined.

The cap 51 is coaxially disposed on the center axis 1. The cap 51 thus uniformly presses the nozzle tip 31 against the body 111. The second abutting plane 35 uniformly pressing the second restraining plane 27 increases the sealing of the second abutting plane 35 and the second restraining plane 27.

The nozzle tip 31 is inserted into the tip mounting hole 25 to be fixed by the cap 51. When the nozzle tip 31 is mounted on the body 111, the second introducing passage 23 and the third introducing passage 39 forms an introducing passage 72. As the nozzle tip 31 and the body 111 are coaxially assembled, the introducing passage 72 forms a single cylindrical bore.

According to the present embodiment, the nozzle tip 31 and the body 111, and the body 111 and the nozzle holder 91 are assembled coaxially to each other. Thus, the cylindrical choke portion 43, the conical portion 41 and the introducing passage 72 are accurately positioned with respect to the nozzle mounting hole 93. The liquid jet ejected from the cylindrical choke portion 43 is thus more accurately ejected along the nozzle mounting hole 93.

The nozzle tip 31 is a right cylinder as a whole. The nozzle tip 31 has an internal shape that is a rotary shape disposed coaxially with the outer cylindrical surface 33. Thus, the nozzle tip 31 is easy to manufacture, and easy to finish to an accurate shape. This improves the convergence, biting property and inclination of the jet ejecting from the nozzle 10.

The nozzle tip 31 is removable. Thus, the nozzle tip 31 and the body 111 are respectively replaceable. The nozzle tip 31 is more easily worn than the body 111. The nozzle 10 according to the embodiment is economical as each member can be replaced according to the wear amount.

The present invention is not limited to the embodiments described above, and various modifications can be made without departing from the gist of the present invention, and all technical matters included in the technical idea described in the claims are the subject matter of the present invention. While the foregoing embodiments illustrate preferred examples, those skilled in the art will appreciate that various alternatives, modifications, variations, or improvements may be made in light of the teachings disclosed herein and are within the scope of the appended claims.

REFERENCE SIGNS LIST

10, 100 Nozzle
13 Cylindrical portion
21 Cap external thread
23 Second introducing passage
25 Tip mounting hole
31 Nozzle tip
33 Outer cylindrical surface
39 Third introducing passage
41 Conical portion
43 Cylindrical choke portion
51 Cap
55 Cap internal thread
61 Jet passage hole
72 First introducing passage
91 Nozzle holder
111 Body

What is claimed is:

1. A nozzle configured to be mounted to a nozzle holder having a nozzle mounting hole having a right cylindrical shape, an outlet port connected to a bottom surface of the nozzle mounting hole, and a mounting internal thread disposed at the outlet port, the nozzle comprising:

a mounting external thread disposed at a first end, the mounting external thread being a parallel thread that fits with the mounting internal thread;

a cylindrical portion configured to engage with the bottom surface and side surface of the nozzle mounting hole;

a first introducing passage disposed coaxially with the cylindrical portion;

a cylindrical choke portion disposed coaxially with the cylindrical portion, the cylindrical choke portion having a smaller diameter than the first introducing passage; and a conical portion connecting the first introducing passage to the cylindrical choke portion.

2. The nozzle according to claim 1, wherein the nozzle mounting hole has a first restraining plane, and the cylindrical portion has a first abutting plane that comes in contact with the first restraining plane.

3. The nozzle according to claim 2, wherein
the first abutting plane is in surface contact with the first restraining plane to seal liquid between the first abutting plane and the first restraining plane.

4. A nozzle configured to be mounted to a nozzle holder having a nozzle mounting hole having a right cylindrical shape, an outlet port connected to a bottom surface of the nozzle mounting hole, and a mounting internal thread disposed at the outlet port, the nozzle comprising:
a body including
a mounting external thread disposed at a first end, the mounting external thread being a parallel thread that fits with the mounting internal thread,
a cylindrical portion configured to engage with the bottom surface and side surface of the nozzle mounting hole,
a tip mounting hole disposed coaxially with the cylindrical portion,
a second introducing passage connected to the tip mounting hole, the second introducing passage disposed coaxially with the cylindrical portion, and
a cap external thread disposed at a second end that is opposite to the first end;
a nozzle tip inserted in the tip mounting hole, the nozzle tip including
an outer cylindrical surface that fits in the tip mounting hole,
a third introducing passage connected to the second introducing passage, the third introducing passage disposed coaxially with the outer cylindrical surface, the third introducing passage having the same diameter as the second introducing passage,
a cylindrical choke portion disposed coaxially with the outer cylindrical surface, the cylindrical choke portion having a smaller diameter than the third introducing passage, and
a conical portion connecting the third introducing passage to the cylindrical choke portion; and
a cap including
a jet passage hole, and
a cap internal thread that fits with the cap external thread.

5. The nozzle according to claim 4, wherein
the nozzle mounting hole has a first restraining plane, and
the body has a first abutting plane that comes in contact with the first restraining plane.

6. The nozzle according to claim 5, wherein
the first abutting plane is in surface contact with the first restraining plane to seal liquid between the first abutting plane and the first restraining plane.

7. The nozzle according to claim 6, wherein
the tip mounting hole has a second restraining plane, and
the nozzle tip has a second abutting plane that comes in contact with the second restraining plane.

8. The nozzle according to claim 5, wherein
the tip mounting hole has a second restraining plane, and
the nozzle tip has a second abutting plane that comes in contact with the second restraining plane.

9. The nozzle according to claim 4, wherein
the tip mounting hole has a second restraining plane, and
the nozzle tip has a second abutting plane that comes in contact with the second restraining plane.

10. The nozzle according to claim 9, wherein
the second abutting plane is in surface contact with the second restraining plane to seal liquid between the second abutting plane and the second restraining plane.

11. A nozzle configured to be mounted to a nozzle holder having a nozzle mounting hole having a right cylindrical shape, an outlet port connected to the nozzle mounting hole, and a mounting internal thread disposed at the outlet port, the nozzle comprising:
a body including
a mounting external thread disposed at a first end, the mounting external thread being a parallel thread that fits with the mounting internal thread,
a cylindrical portion configured to fit in the nozzle mounting hole,
a tip mounting hole disposed coaxially with the cylindrical portion,
a second introducing passage connected to the tip mounting hole, the second introducing passage disposed coaxially with the cylindrical portion, and
a cap external thread disposed at a second end that is opposite to the first end;
a nozzle tip inserted in the tip mounting hole, the nozzle tip including
an outer cylindrical surface that fits in the tip mounting hole,
a third introducing passage connected to the second introducing passage, the third introducing passage disposed coaxially with the outer cylindrical surface, the third introducing passage having the same diameter as the second introducing passage,
a cylindrical choke portion disposed coaxially with the outer cylindrical surface, the cylindrical choke portion having a smaller diameter than the third introducing passage, and
a conical portion connecting the third introducing passage to the cylindrical choke portion; and
a cap including
a jet passage hole, and
a cap internal thread that fits with the cap external thread,
wherein the nozzle tip protrudes from the body, and
the cap has a tip support hole for fitting the outer cylindrical surface.

* * * * *